Figure 1:
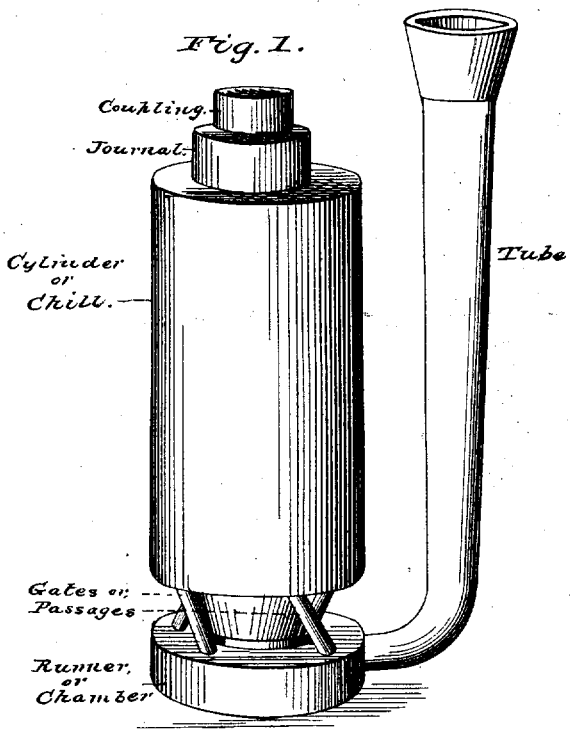
Figure 2:
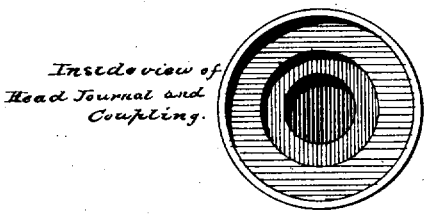
Figure 3:
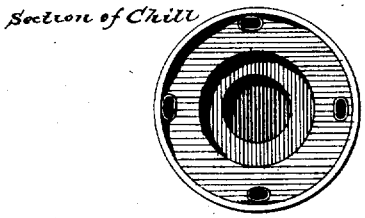
Figure 4:
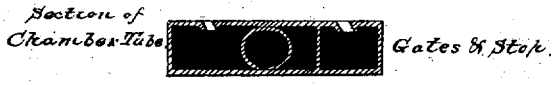

8668X

J. Harley,

Casting Chilled Rolls, &c.

Patented Mar. 3, 1835.

N. PETERS, PHOTO-LITHOGRAPHER, WASHINGTON, D. C.

Mar. 3. 1835 8668 X 297

James Harley. Pittsburg Pennsylvania

Letters Patent

The schedule referred to in these Letters Patent and making part of the same containing a description in the words of the said James Harley himself of his improvement in the mode of casting chilled Rollers and other metallic Cylinders and Cones.

To all to whom these presents shall come. Be it Known that I James Harley of Pittsburg in the County of Alleghany and State of Pennsylvania have invented a new and useful improvement in the mode of casting Chilled Rollers and other metallic Cylinders & Cones & that the following is a full and exact description of the construction and operation of said machine or improvement as invented or improved by me In order to show the object of my improvement I state the usual method as now practiced in casting chilled Rollers as follows. The mould in which they are cast consists of a main central portion formed by a hollow metallic cylinder and the two ends called journals & couplings which are moulded in sand. Now if the metal be poured into such a mould in the usual manner that is through a tube descending to its lower extremity, the motion thus communicated to it as it rises in the mould tends to throw all the sand, dross, slag &c towards the external part of the Roller and thereby occasions cracks flaws and other imperfections on its surface. Therefore in order to obviate this injurious tendency it is the custom to stir the fluid metal with a rod so as to give to it a rotary motion by thus stirring in order to bring the light substances to the centre. But this operation of stirring is dangerous and does not effect its object with certainty. My method of construction is to insert a pipe or pipes (which may be called gates) at openings into or near the bottom of the main chill cylinder or near the inner surface of the said Cylinder and the line of direction of said pipes or gates is not to be that of a perpendicular to said Bottom or inner surface. but that
of an oblique or slanting line usually about equal to thirty degrees
that iz approaching the direction of a tangent to the cylinder.
Beneath these openingz by which the pipez enter the main chill Cylin
der iz to be formed a circular chamber with az many openingz az
there are pipes to communicate with the openingz into the cylinder
and the pipez are to connect thiz chamber with the cylinder in the oblique
or slanting direction above described. it iz also advantageous to have
this circular chamber closed by a partition across it on one side of the
opening in the circumference left for the insertion of the descending
tube by which the fluid metal iz to be poured in. Thiz iz the constru
tion of my improvement. the manner of using it iz az follows.
The melted metal iz poured in at the descending tube by which it
arrives at the opening at the bottom of thiz tube. leading on to the
circular chamber. here the metal enters and on one side being
arrested by the partition closing the chamber at the side of thiz
opening. the stream or course of the metal will be driven and
consequently continued round. the partition iz to be so placed az
to give the course of the stream in the same direction round az
that to which the pipez or gates lean. The metal flowing up
these inclined tubez or pipes acquires a rotary motion on entering
the main cylinder which iz the object I wish to attain, thereby
preventing the necessity of stirring with a rod. and thiz rotary
motion iz necessary in order to bring the light substances to the
centre and throw the heaviest and best metal to the circum
ference. What I claim az my own invention and not before
or previously known in the above described machine or improve
ment iz that the tube or tubes or passagez called gatez through
which the metal iz to be conveyed into the mould shall not enter the
mould perpendicularly at the bottom but slanting or in a direction
approaching to a tangent of the cylinder. or if the Gates enter
the mould horizontally. or nearly so that they shall not enter
in the direction of the axis of the cylinder but in a tangent form or inclining towards a tangent of the cylinder
In testimony that the above is a full and exact description
of the construction and application of my improvement or machine
as invented or improved by me I have hereunto set my hand
this 17th day of February in the year of our Lord Eighteen hun
dred and thirty-five Witnesses { David McClelland
Enoch Higby Rob^t Harley 816 wds (Drawing)

Ex^d
C.M.W.